United States Patent
Geerdes et al.

[15] 3,680,362
[45] Aug. 1, 1972

[54] VISCOSIMETER

[72] Inventors: Dirk J. Geerdes, Woensdrecht; Cornelis J. Van Vessem, Bergen op Zoom, both of Netherlands

[73] Assignee: Kunstharsfabriek Synthese N.V., Bergen op Zoom, Netherlands

[22] Filed: March 17, 1970

[21] Appl. No.: 20,374

[52] U.S. Cl. .............................................. 73/56
[51] Int. Cl. ........................................ G01n 11/06
[58] Field of Search ............................. 73/56, 55

[56] References Cited

UNITED STATES PATENTS

| | | |
|---|---|---|
| 3,071,961 | 1/1963 | Heigl et al. .................. 73/55 |
| 3,242,720 | 3/1966 | Zavasnik ...................... 73/56 |
| 3,540,264 | 11/1970 | Cerrutti ....................... 73/55 |

FOREIGN PATENTS OR APPLICATIONS

| | | |
|---|---|---|
| 1,566,139 | 3/1969 | France ....................... 73/56 |
| 121,595 | 10/1958 | U.S.S.R. ................... 73/55 |

*Primary Examiner*—Louis R. Prince
*Assistant Examiner*—Joseph W. Roskos
*Attorney*—Kurt Kelman

[57] ABSTRACT

An apparatus for measuring the viscosity of a liquid product in a vessel, for instance, a reaction vessel, a dilution vessel or an evaporator, includes a measuring cell whose measuring chamber is connected to a capillary through which the liquid may be emptied from or filled into the chamber, the time of starting and ending the emptying or filling being accompanied by electric control pulses so that this time interval may be measured and the flow of a gas supplied to the cell under pressure is reversed.

13 Claims, 11 Drawing Figures

INVENTORS.
DIRK J. GEERDES
CORNELIS J. VAN VESSEM
BY *Kurt Kelman*
AGENT

INVENTORS.
DIRK J. GEERDES
CORNELIS J. VAN VESSEM
BY
*Kurt Kelman*

AGENT

INVENTORS.
DIRK J. GEERDES
CORNELIS J. VAN VESSEM
BY
*Kurt Kelman*
AGENT

3,680,362

VISCOSIMETER

The invention relates to an apparatus for measuring the viscosity in vessels by means of a capillary viscosimeter during the preparation of intermediate products and final products.

Measuring the viscosity is in many chemical and physical processes an act of great importance in order to have the process controlled correctly. An example hereof is the preparation of synthetic resins, in which the viscosity as a rule increases during the polymerization and/or condensation process. A final product of a certain resin type must show a viscosity within a determined range, mostly indicated for a certain concentration in an appropriate solvent to obtain the desired properties. It is clear that for the course of the reaction as well as for the determination of the end of the reaction, a quick and frequent measuring of the viscosity is of great importance.

So far the measuring of the viscosity during the preparation of synthetic resins has been carried out mostly outside the reactor. As a rule, samples are taken from the reaction vessel during the process at certain intervals of time, which samples are dissolved in a solvent, such as white spirit or xylol, to a certain concentration. The viscosity of the resin solutions obtained can then be measured in various manners, such as by measuring the flow time in seconds at 20° C of the resin solution from a measuring cup, the comparative determination of the viscosity of a resin solution with the Gardner-Bubble viscosimeter or by means of the falling ball method according to Hoppler. All these and similar methods, by which the viscosity of the resin solution is measured at low temperature, as a rule 20° or 25° C, are, however, if carried out exactly, cumbersome and time-consuming. The result is known only after a period of time of 20–30 minutes after having taken a sample from the reaction vessel. The determination of the correct moment at which the reaction must be stopped is for that reason often inexact. All this has as consequence that the reproducibility of the viscosity of the final product often leaves much to be desired.

It is the primary object of the present invention to overcome these and other disadvantages and to make it possible to make rapid and successive measurements of the melt viscosity of a liquid reaction product, for instance during a polymerization or condensation process, and thus to obtain a very good reproducibility of the final viscosity of each product.

The measurement of the viscosity by the apparatus of this invention is based on the known Hagen-Poiseuille principle that the time required to have a constant volume of a liquid flow through a capillary is directly proportional to the viscosity and the length of the capillary, and inversely proportional to the pressure difference between the ends of the capillary and the fourth power of the radius of the capillary. While this principle has been used in capillary viscosimeters for the accurate measurement of viscosity, known instruments of this type are not suitable for direct use in vessels, for instance reaction vessels, dilution vessels, evaporators.

In accordance with the invention, a capillary viscosimeter is provided which can be arranged directly in a vessel and makes series measurements in the vessel possible. The melt viscosity of the liquid product may be determined at any given moment and in series during the reaction by simply measuring the time necessary for pressing a constant volume of the liquid through a capillary at an adjusted pressure difference.

The above and other objects, advantages and features of the present invention will be better understood by reference to the following detailed description of certain preferred embodiments thereof, taken in conjunction with the accompanying drawing wherein FIG. 1 is a schematic view of one embodiment of an apparatus according to this invention;

Figure 1:
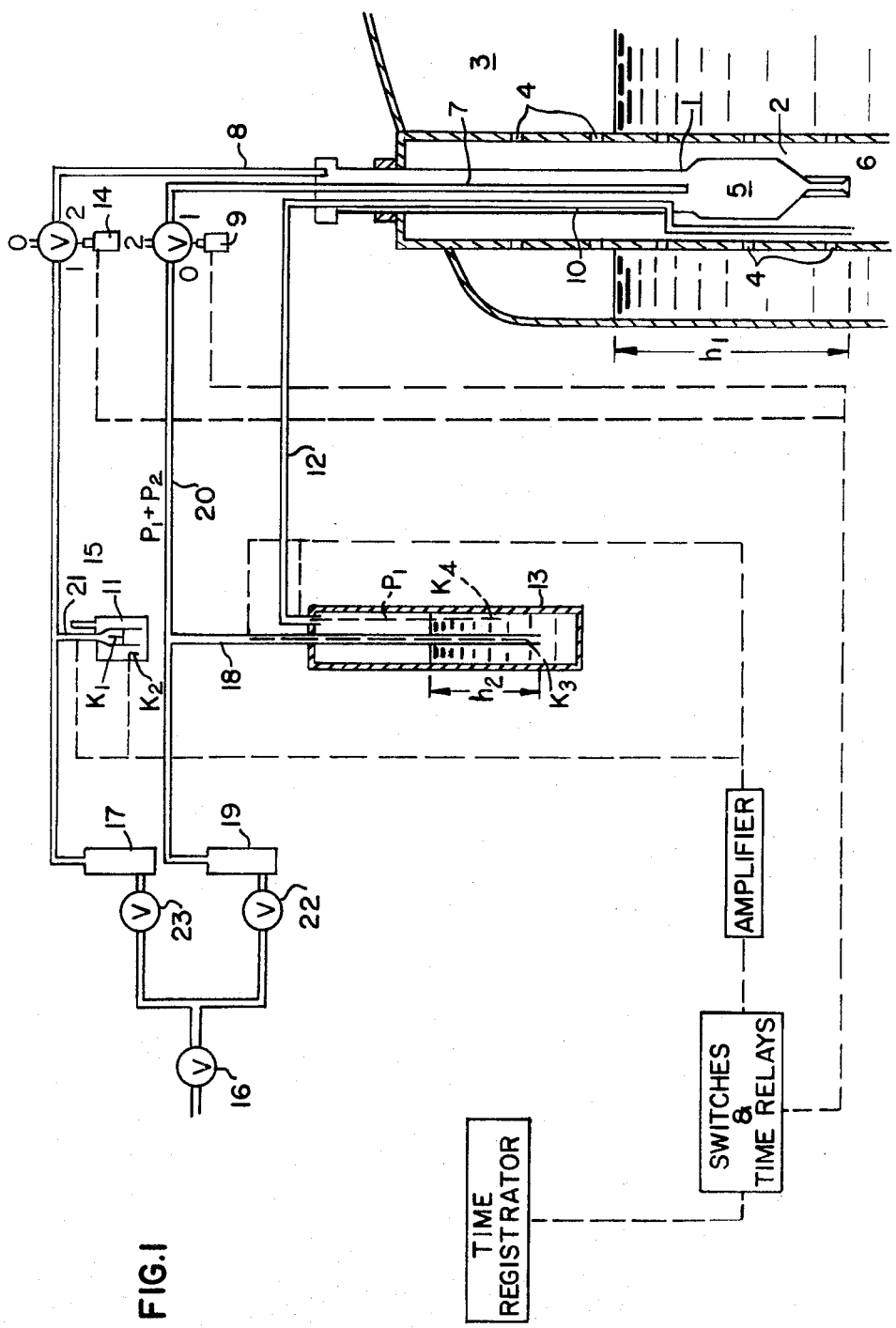

Referring now to the drawing and first to FIG. 1, the apparatus is shown to comprise a measuring cell 1 mounted in, and surrounded by, an immersion tube 2, both of which are immersed in the liquid in reaction vessel 3. The tube 2 has a plurality of vertically spaced ports 4 so that a certain amount of the liquid may flow through the tube, which serves to prevent excessive turbulences that may be caused by a stirrer in the reaction vessel in the vicinity of capillary 6.

The measuring cell defines a measuring chamber 5 having a pre-determined volume, for instance 100 cc, the upper end of the measuring chamber being delimited by the end of conduit 7 and the lower end of the measuring chamber leading into a capillary tube 6. A flow of an inert gas, such as nitrogen, enters the measuring cell under a predetermined pressure through valve 16. While the cell is filled with liquid from the reaction vessel to measure its viscosity, the valve 23 has been adjusted to supply a small gas flow of about five to 10 liters per hour through conduit 8 into cell 1, the gas flowing through rotameter 17, where its flow is measured, and escaping again through conduit 7, the valve position 2 of the solenoid valve 9 being open to vent the gas to the surrounding atmosphere. After the measuring chamber 5 has been filled so that the liquid blocks the output end of conduit 7, the flow of gas of about 50 to 100 liters per hour supplied by valve 22 passes through conduit 7 into cell 1 and presses the liquid out of the measuring chamber 5 and through capillary 6, solenoid valve 9 being repositioned in a manner to be described hereinafter.

A compensation tube 10 is also mounted in the measuring cell 1 to compensate for variations in the pressure and liquid level in reaction vessel 3, in a manner to be also described hereinafter.

The viscosity measuring apparatus may be used under different pressure conditions, for which purpose the outlet 0 of valve 14, the outlet 2 of valve 9 and the outlet 15 of vessel 11 may be connected to the space above the liquid level in reaction vessel 3. The measuring result, i.e. the time required to press the liquid out of the measuring chamber of cell 1, is independent on the immersion depth of the cell in the liquid and the pressure over the surface of the liquid in the reaction vessel.

The apparatus operates in the following manner:

When the apparatus is out of operation, gates 1–0 of solenoid valve 14 and gates 1–0 of solenoid valve 9 are in communication. Thus, any gas supplied escapes through the open gates of valve 14 and through the capillary 6 into the liquid in the reaction vessel.

When the apparatus is switched on, gates 1 and 2 of valve 9 are brought into communication and a time relay connected to valve 9 is actuated. The time relay is adjustable to determine the very short delay in which the solenoid valve 14, which is also connected to the relay, is switched over from position 1–0 to the position wherein the gates 1 and 2 are in communication. In this short time lag between the operation of valves 9 and 14, the gas pressure in conduits 7,8 and in measuring cell 1 is discharged through open gate 2 of valve 9. Now, the measuring cell 1 is filled with the liquid from the reaction vessel whose viscosity is to be measured.

While the measuring chamber 5 fills up, the inert gas flows through valve 23, rotameter 17 and communicating gates 1 and 2 of valve 14 into conduit 8 whence it is discharged into the measuring cell and escapes therefrom through conduit 7 and the communicating gates 1 and 2 of valve 9. This continues as long as the liquid in the measuring chamber does not block access to conduit 7.

Meanwhile, a flow of about 50 to 100 liters per hour of inert gas passes through adjustable valve 22 and rotameter 19 into tube 18 which is adjustably positioned in vessel 13, whence the gas flows out through conduit 12 into compensation tube 10 which vents the gas into the liquid in reaction vessel 3. Since, during the filling period of the measuring cell, the gates 1 and 2 of valve 9 are in communication while the valve gate 0 is blocked, no gas will pass through the valve 9 from conduit 20 which branches off tube 18.

The vessel 13 is closed on top, the vessel being partially filled with an electrically conductive liquid, for instance a 1 percent KOH solution in a mixture of water and glycol, and the pressure $p_1$ in the vessel above the liquid level being equal to the sum of the hydrostatic pressure of column $h_1$ extending from the outlet ends of the compensation tube 10 and capillary 6 to the surface of the liquid in the reaction vessel, and the pressure over the liquid level in the reaction vessel. During filling, the pressure in conduit 20 is, therefore, equal to the sum of $p_1$ and the hydrostatic pressure $p_2$ of column $h_2$ extending from the outlet end of tube 18 to the surface of the conductive liquid in vessel 13.

A pair of electrodes $k_3$ and $k_4$ are positioned in vessel 13, with electrode $k_3$ extending into tube 18 to a point about an inch or so from the lower or outlet end of the tube. During filling of the measuring chamber 5 with liquid and while inert gas is supplied to conduit 18 and bubbled therefrom into the electrically conductive liquid in vessel 13, the conductive connection between electrodes $k_3$ and $k_4$ is interrupted. As soon as the measuring chamber has been filled and the lower end of conduit 7 has been blocked by the liquid, the inert gas flowing into the measuring chamber through conduit 8 can no longer escape through conduit 7. This causes a small over-pressure to develop in conduit 8 and to back up into branch conduit 21 leading from conduit 8 into vessel 11. Vessel 11 is also partially filled with an electrically conductive liquid, for instance the same as that in vessel 13, a pair of electrodes $k_1$ and $k_2$ being positioned in vessel 11, with the electrode $k_1$ being mounted in tube 21. When the overpressure in conduit 21 depresses the level of the electrically conductive liquid therein, the electrical connection between electrodes $k_1$ and $k_2$ is interrupted as soon as the liquid level is below electrode $k_1$.

Electrodes $k_1$–$k_2$ and $k_3$–$k_4$ are connected to an amplifier which supplies the electrodes with a voltage, for instance an alternating voltage of a maximum of one volt. These electrodes produce electrical control signals for operating the solenoid valves, the time relay, the switches and the time indicator dial or recorder in the following manner:

When measuring chamber 5 has been filled with the liquid whose viscosity is to be measured, access to conduit 7 is thus blocked by the liquid, a slight overpressure develops in conduit 8 and conduit 21, the level of the electrically conductive liquid in vessel 11 is depressed, and electrical contact between electrodes $k_1$ and $k_2$ is thus interrupted, the electrical control circuit connected to solenoid valve 14 switches the same over from the position wherein gates 1 and 2 are in communication and gas, therefore, flows into conduit 8 to a position wherein valve gate 1 communicates with valve gate 0 of valve 14, thus venting the gas. At the same time the solenoid valve 9 is switched over from the position wherein its gates 1 and 2 are in communication and gas, therefore, is vented from conduit 7 to a position wherein gates 0 and 1 of valve 9 are in communication so that gas from conduit 20 may enter into conduit 7. In other words, the gas flow through the measuring cell is reversed, and the gas flowing from conduit 7 begins to press the liquid out of the measuring chamber 5 into capillary 6.

Simultaneously, the time recorder is switched on to register the time required to press the liquid out of measuring chamber 5. Also simultaneously, an adjustable time relay interrupts the electrical contact between electrodes $k_3$ and $k_4$ for a few seconds. This is to prevent the two electrodes from coming into electrical contact due to the fact that the electrically conductive liquid in vessel 13 rises in tube 18 to the level of electrode $k_3$ by the sudden temporary pressure drop in conduit 20 when the valve 9 is opened to communicate with conduit 20. At this point, the measuring cell is emptied under a gas pressure $p_1+p_2$ through capillary 6. During this period, too, the gas pressure flowing in through valve 22 and rotameter 19 at an hourly rate of about 50 to 100 liters escapes through conduit 18, vessel 13, conduit 12 and compensation tube 10 into the reaction vessel 3. Consequently, any pressure variations occurring in the reaction vessel are compensated during measuring.

At the moment the measuring cell 1 is emptied, the gas pressure in conduit 7 drops from $p_1+p_2$ to $p_1$, which causes the liquid in vessel 13 suddenly to rise in tube 18, thus reestablishing electrical contact between electrodes $k_3$ and $k_4$. This repeats the previously described cycle and simultaneously causes the time recorder to be switched off. If desired, an adjustable interval may be provided by means of a time relay, whereupon a new measuring cycle may be started.

Figure 2:
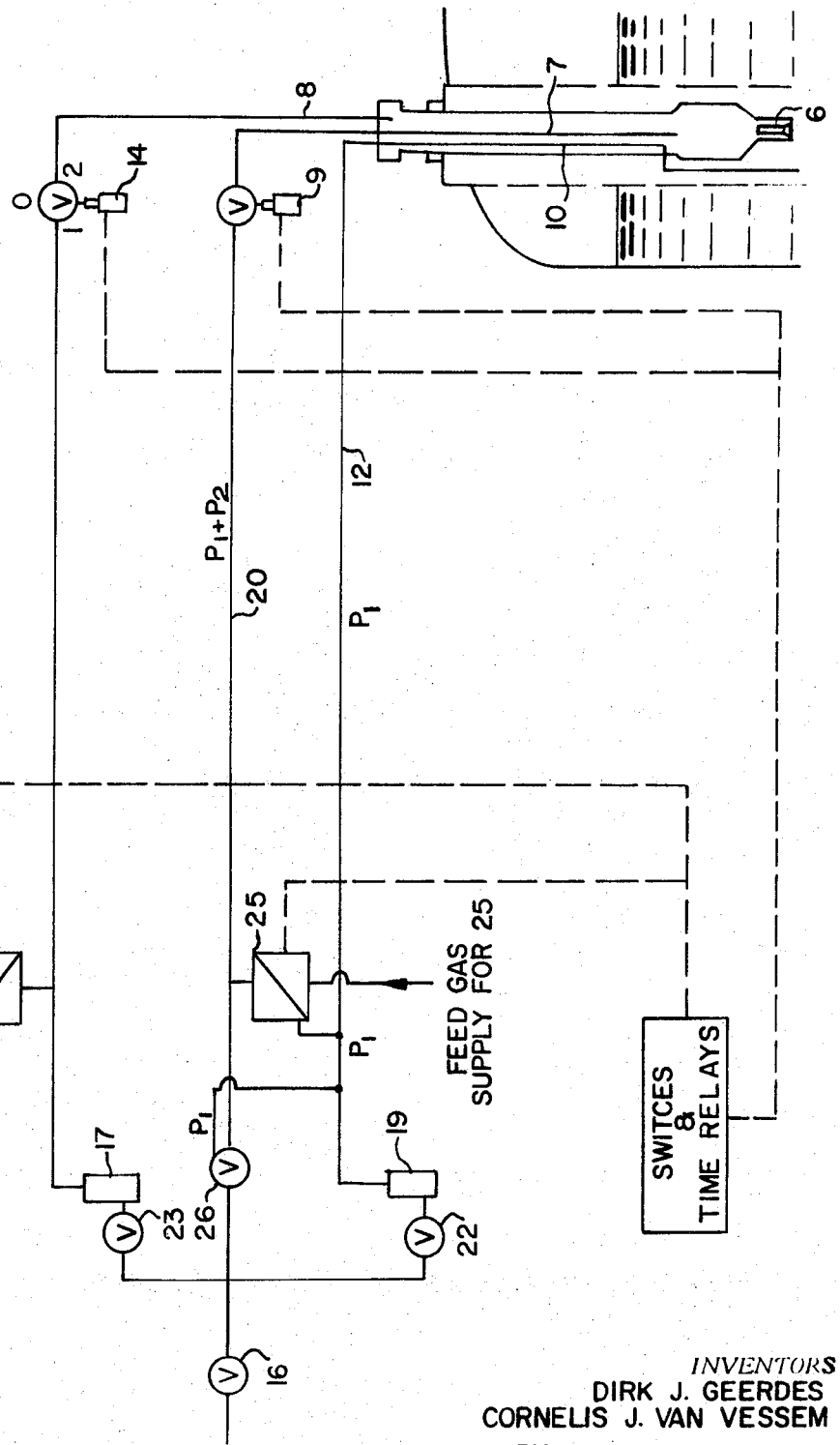
FIG. 2 is a similar view of a modification of this apparatus.

In the modified embodiment of FIG. 2, like reference numerals designate like parts functioning in an equivalent manner to avoid redundancy in the description.

In this apparatus, however, switch means $k_1$–$k_2$ and vessel 11 have been replaced by a pressure differential sensitive switch 24 and the switch means $k_3$–$k_4$ and the vessel 13 have been replaced by the combination of a pressure differential sensitive switch 25 and the pressure balanced reducing valve 26. Switch 25 and the pressure balanced reducing valve 26 function equivalently to electrodes $k_3$–$k_4$ in vessel 13. The pressure balanced reducing valve 26 delivers a gas pressure $p_1+p_2$ in conduit 20 when the gas pressure in conduit 12 is $p_1$.

At the moment the pressure in conduit 20 drops from $p_1+p_2$ to $p_1$, due to the fact that the measuring chamber is empty, the valve 26 is not able to produce the additional pressure $p_2$ because the gas escapes through the capillary 6. As a consequence thereof, the pressure differential switch 25, connected to solenoid valves 14 and 9 switches valve 14 from the position wherein gates 1 and 0 are in communication to the position wherein gates 1 and 2 are in communication, and switches valve 9 from the position wherein gates 0 and 1 are in communication to the position wherein gates 1 and 2 are in communication. As a consequence thereof, valve 26 increases again the pressure in conduit 20 from $p_1$ to $p_1+p_2$.

The pressure differential sensitive switches 24 and 25 and the pressure balanced reducing valve 26 are commercially available pneumatic instruments.

In a variant of the embodiment of FIG. 2 (not illustrated) the pressure balanced reducing valve 26 has been eliminated and its function is taken over by the compensation tube 10 by extending this tube sufficiently to increase the hydrostatic pressure in this tube by an amount equal to that of column $h_2$ in FIG. 1.

In this embodiment the conduits 20 and 12 are interconnected so that, during the period of time when the liquid whose viscosity is measured is pressed out of the measuring chamber, the pressure in conduits 20 and 12 is the same, i.e. $p_1+p_2$. At the moment the gas can escape through capillary 6, because the measuring chamber is empty, the pressure in conduit 20 drops to $p_1$, as a consequence of which switch 25 actuates the control circuit to advance to the next cycle.

Figure 3:
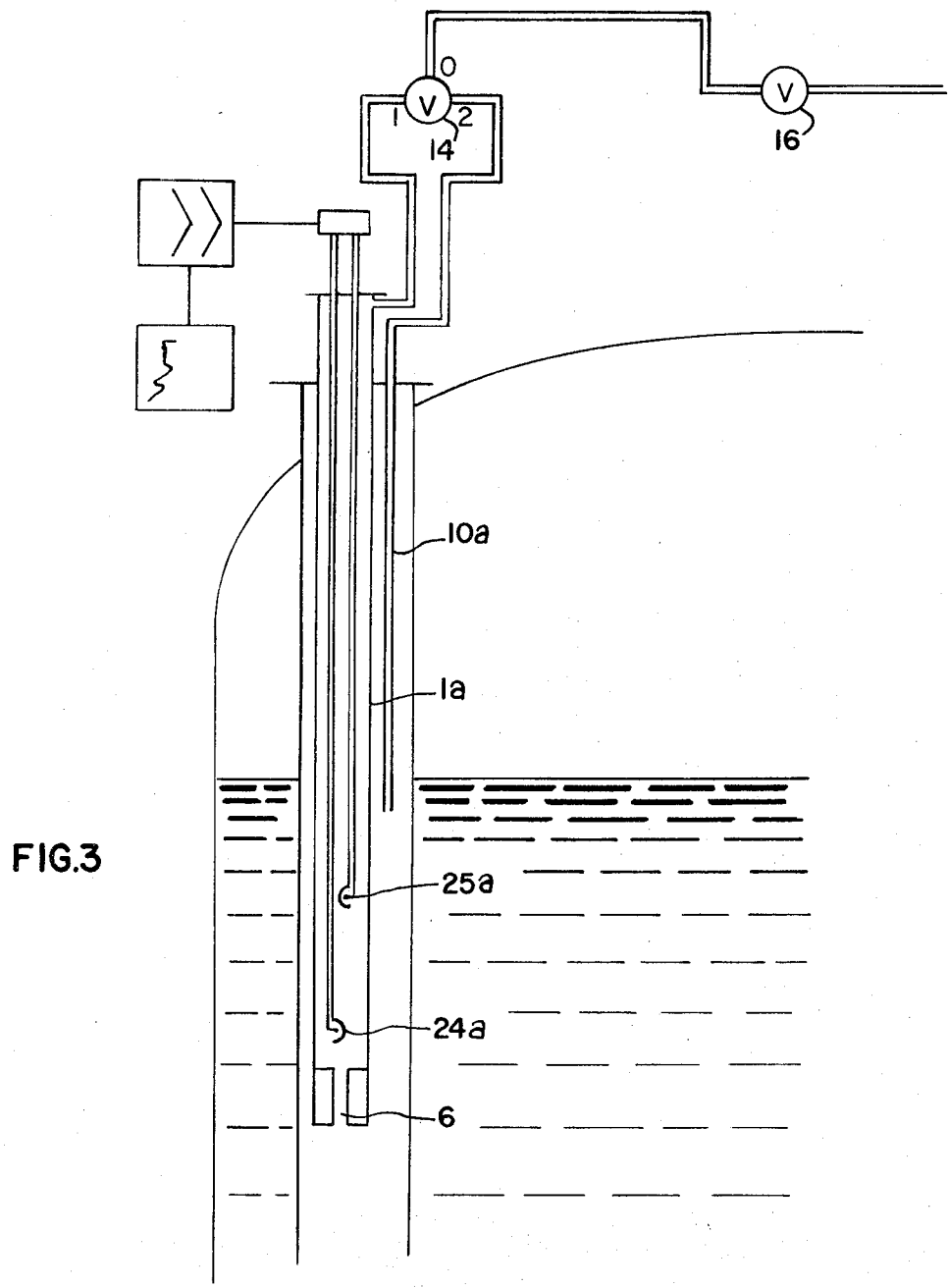
FIG. 3 shows still another embodiment.

In the embodiment as shown in FIG. 3 the switching means for the control circuit has been replaced by two conductivity measuring devices 24a and 25a positioned in the measuring cell, these devices producing electrical control pulses in response to changes in conductivity from zero to a measurable value. The inert gas is supplied under a predetermined pressure by metering valve 16, and when the apparatus is out of operation, gates 0 and 1 of solenoid valve 14 are open so that the gas escapes through capillary 6 into the liquid in the reaction vessel. When the apparatus is switched on, gates 1 and 2 of valve 14 are brought into communication, as a consequence of which the measuring cell is filled under the influence of the hydrostatic pressure difference between the outlets of the capillary 6 and the conduit 10a. When the liquid reaches the conductivity measuring device 24a, the device produces an electrical control pulse which starts the time recorder. When the liquid level in measuring cell 1a reaches the conductive measuring device 25a, the device produces an electrical control pulse stopping the time recorder and actuating valve 14 by bringing gates 1 and 0 into communication, as a consequence of which the cell is emptied under the influence of the gas pressure. As soon as the liquid level has passed the conductivity measuring device 24a, valve 14 is actuated so that gates 1 and 2 are brought into communication again. At that moment a new measuring cycle starts.

Figure 4:
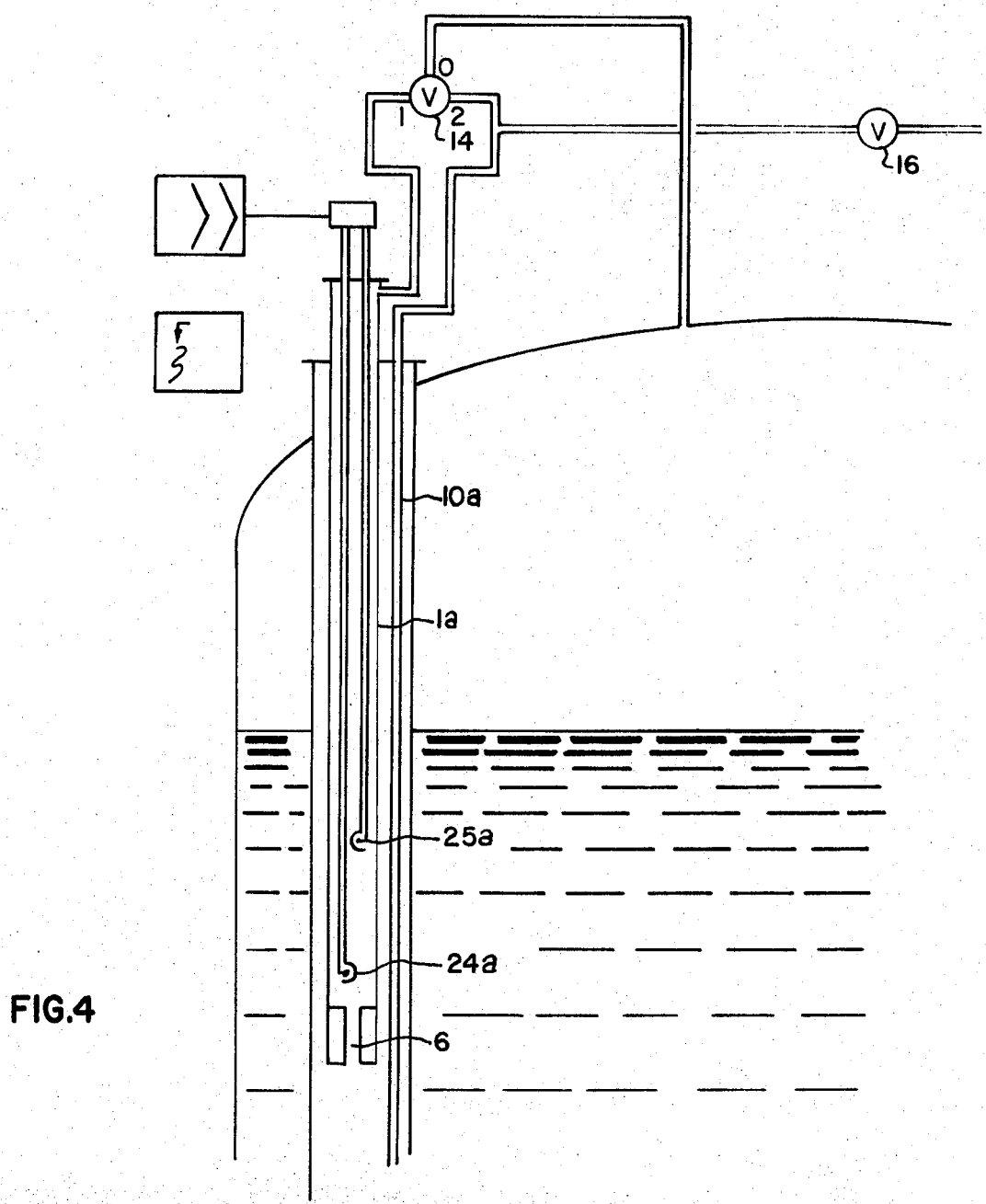
FIG. 4 shows a modification of this embodiment.

FIG. 4 shows another modification of the apparatus. Also here the electrical pulses are produced by change of conductivity from zero to a measurable value and vice versa. The insert gas is supplied under a predetermined pressure by a reducing valve 16. When the apparatus is out of operation, gates 1 and 2 of the solenoid valve 14 are open so that the gas escapes through capillary 6 into the liquid in the reaction vessel. When the apparatus is switched on, gates 0 and 1 are brought into communication, as a consequence of which the measuring cell is filled. When the liquid reaches the conductivity measuring device 25a, the device produces an electrical pulse which actuates valve 14, as a consequence of which gates 1 and 2 are brought into communication and the time recorder is started. Thereupon the gas pressure in the measuring cell, which is in communication with the compensation tube presses the liquid in the measuring cell through the capillary. When the liquid level in the measuring cell 1a reaches the conductivity measuring device 24a the device produces again an electrical pulse delay stopping the time recorder and actuating an adjustable time relay to start the measuring cycle again.

Also in this embodiment the conductivity measuring devices 24a and 25a may be replaced by capacity measuring devices operating in an equivalent manner.

It is obvious from the above description that the capillary viscosimeter hereinabove described is arranged for use in vessels for chemical and physical processes and makes, moreover, measurements in series possible. By measuring the time necessary for pressing a constant volume of liquid, determined by the dimensions of the measuring chamber, through a capillary at an adjusted pressure difference, the melt viscosity of a synthetic resin, for instance, may be determined in seconds and at a temperature prevailing in the reaction vessel. As will be understood, the melt viscosity is the viscosity of the liquid reaction product at the elevated temperature prevailing during the polymerization or condensation reaction.

By calibrating the capillary viscosimeter at various temperatures with liquids of known viscosity, it is also possible to express the viscosity in poises. In this connection, however, it is as a rule less important for the control of a process to know an absolute viscosity than a quick and accurate comparative information, e.g. to be obtained by time measurement, the more so as one measurement of the dynamic or kinematic viscosity of non-Newton liquids cannot be considered adequate for the definition of the complete flow character.

A condition for the practical use of the apparatus in the preparation of synthetic resins, where the melt viscosity instead of the viscosity of the solution is measured, is the presence of a close relationship between the two forms. As already stated, the final product must show as a rule a viscosity range which is mostly indicated as the viscosity of a solution of the product at low temperature. It has been found that, of each tested resin type, the melt viscosity is decisive for the viscosity of the solution, as elucidated by the tests described below.

Figure 5:
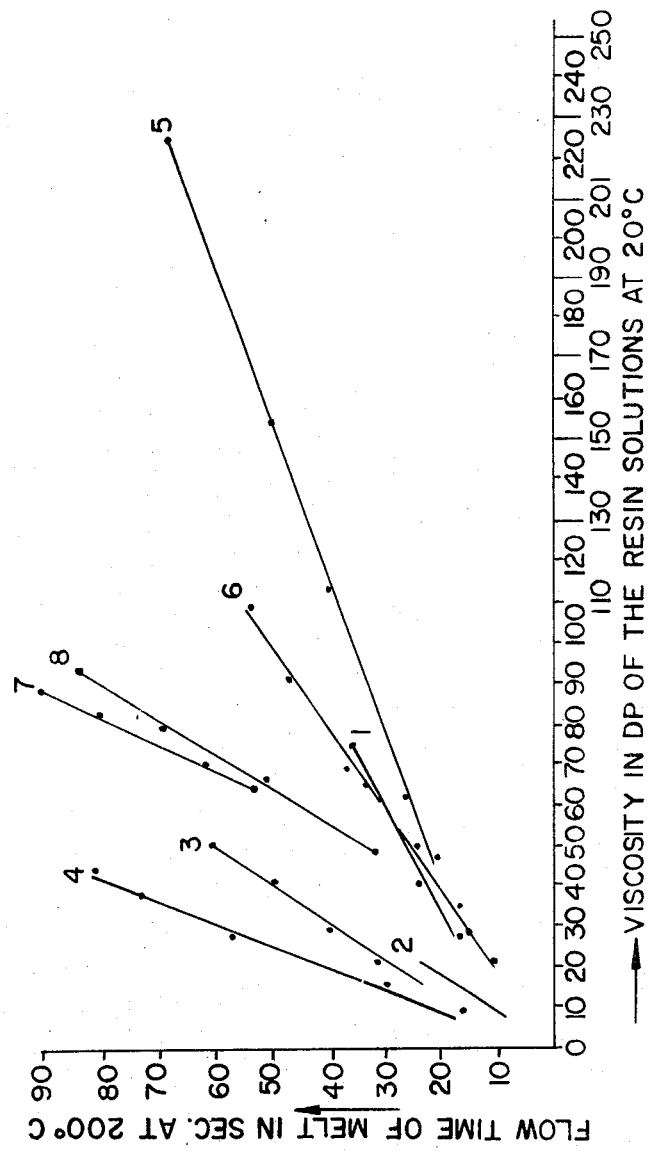
FIG. 5 is a graph illustrating the results of a series of tests.
Figure 6:
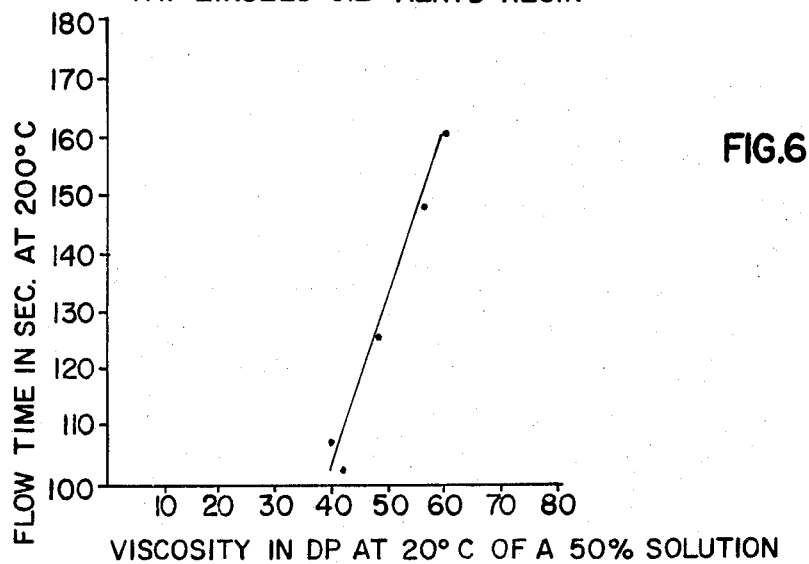
FIG. 6 to 11 are graphs illustrating the relationship of the melt viscosity and solution viscosity of certain test resins.
Figure 7:
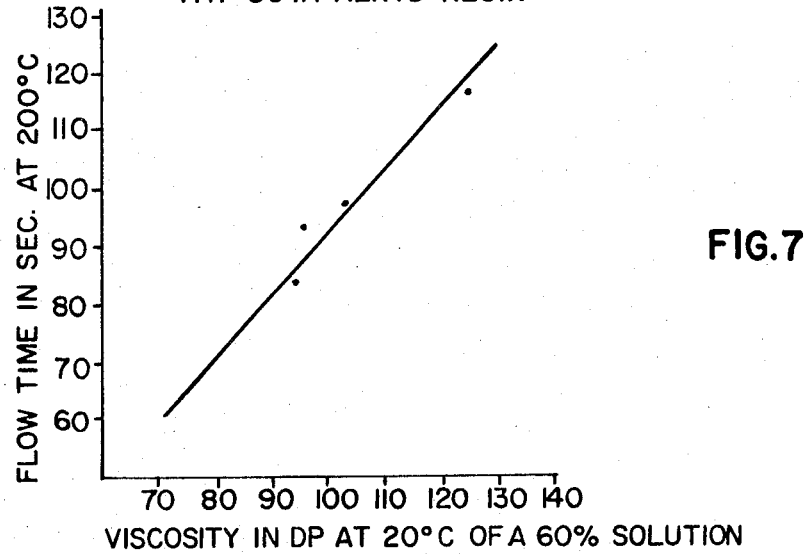
Figure 8:
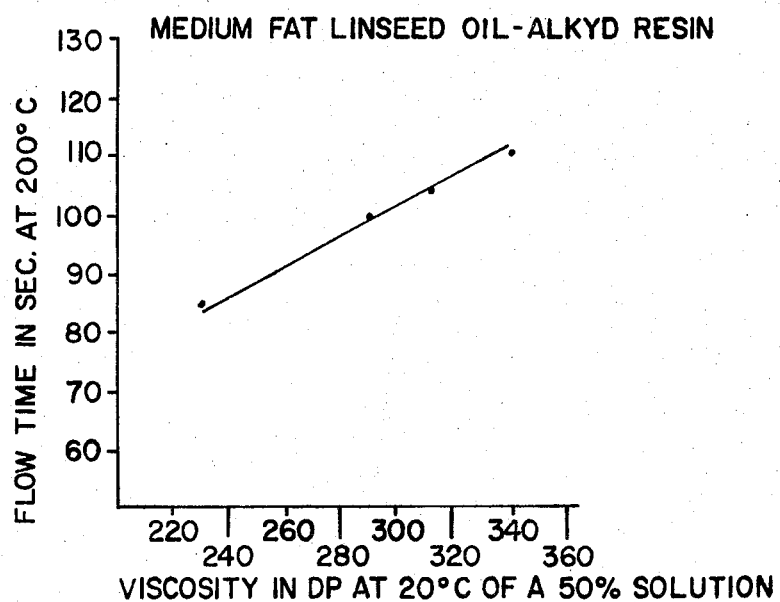
Figure 9:
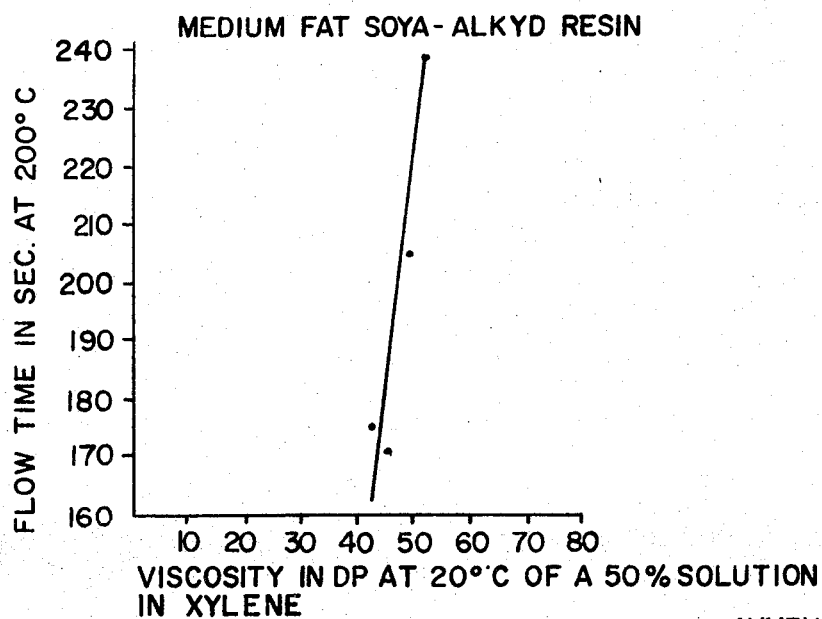
Figure 10:
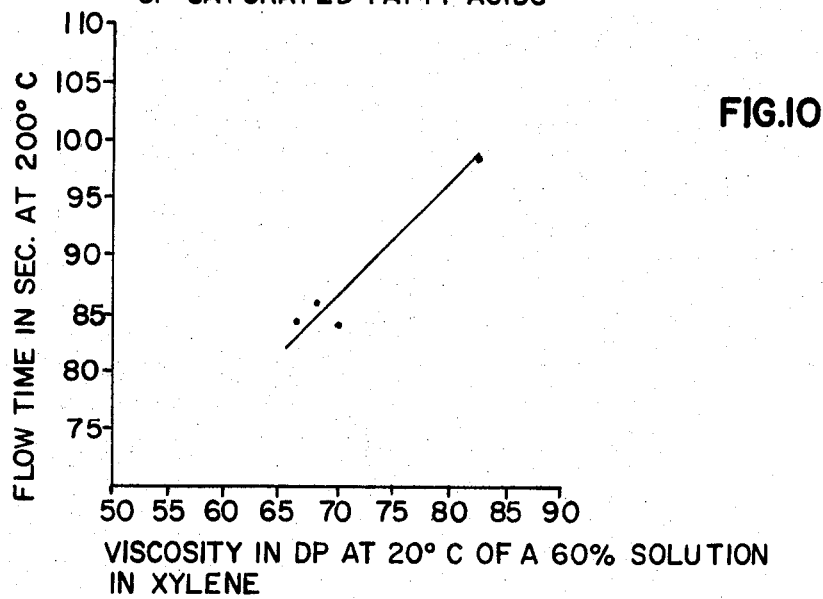
Figure 11:
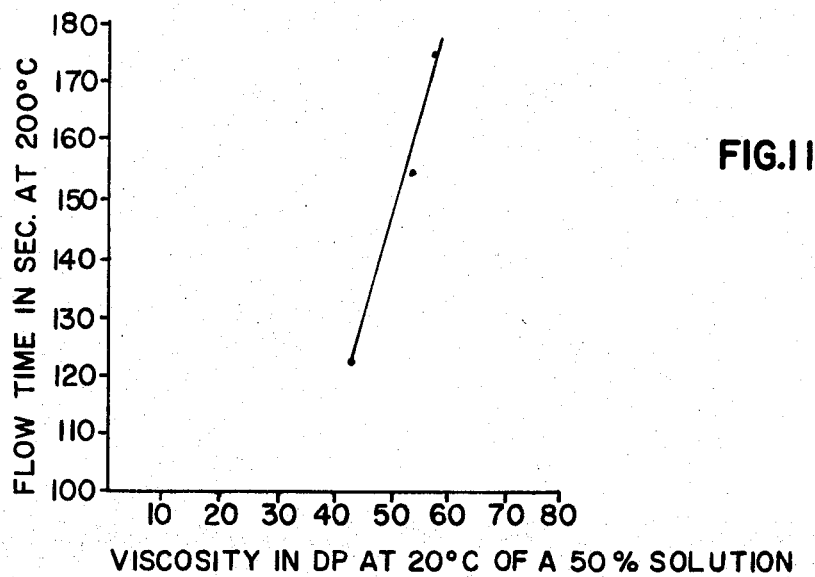

During the preparations of a number of alkyd resins and polyesters, differing in composition and condensation temperature, resin samples were taken from the reaction vessel. These resin samples of increasing viscosity were diluted in a solvent to a predetermined concentration. The viscosity of the resulting resin solutions was determined by means of a so-called bubble viscosimeter according to the principle of Gardner-Holdt at 20° C by comparison. At the time of taking the samples, the melt viscosity of the resin in the reservoir was determined with the capillary viscosimeter according to the invention and expressed in seconds of flow time. The results of the alkyd resins and polyester resin and phenolic resin modified rosin ester mentioned in table I are stated in FIG. 5.

TABLE 1

| Resin No. | Type of resin | Condensation temp. | Solvent used for solution viscosity | concentration of resin in solvent |
|---|---|---|---|---|
| 1 | medium linseed oil-alkyd resin | 230°C | white spirit | 50% |
| 2 | medium soya-bean oil-alkyd resin | 230°C | white spirit | 50% |
| 3 | short oil alkyd resin | 230°C | xylol | 50% |
| 4 | long oil soya alkyd resin | 240°C | white spirit | 50% |
| 5 | long oil alkyd resin based on sun-flower fatty acids | 240°C | white spirit | 50% |
| 6 | short oil resin based on saturated fatty acids | 225°C | xylol | 60% |
| 7 | polyester | 210°C | xylol + butanol | 50% |
| 8 | phenolic resin modified resin ester | 270°C | toluol | 55% |

The almost straight course of the curves shows clearly that there is close relationship between the melt viscosity and solution viscosity during the condensation process, during which the molecule size increases.

In order to test the reproducibility of various resin types, several batches of one and the same alkyd resin were prepared and the relationship between the last-determined melt viscosity at the final temperature of the condensation process and the solution viscosity at 20° of the final product was determined. The results of these tests are indicated in FIGS. 6–11. Each point in a figure corresponds to the measured viscosity value of a final product. Also in these figures, the straight course of the curves is striking, which points to a close relationship between the last-determined melt viscosity and the viscosity of the solution of one and the same resin type. FIGS. 6,7,8 and 9 also show the good reproducibility; an almost equal melt viscosity of the final products of one and the same resin type gives practically the same solution viscosity.

In addition to the preparation of the above-mentioned synthetic resins, the invention may also be applied to the preparation of other products, such as phenolic resins, amino resins, vinyl resins, polyesters, polyurethane resins, acrylate resins, etc.

In general the invention, in addition to the examples already mentioned, can be used wherever it is of importance to measure the viscosity during the preparation of intermediate products and final products directly in a reaction vessel, dilution vessel or evaporator.

Some important conditions for accurate and reproducible measurements of the viscosity in reaction vessels by means of so-called capillary viscosimeters include, first a careful control of the temperature of the liquid in the reaction vessel, the influence of the temperature of the liquid to be measured upon the melt viscosity being considerable, wherefore the deviation may maximally amount to ± 1.5° C; in the second place, the the amount of liquid in the measuring cell to be measured must be constant for each measuring; in the third place, the pressure difference under which the measuring cell is emptied or filled must be the same at each measuring; the hydrostatic pressure of the liquid column calculated from the bottom of the capillary up to the liquid surface and the pressure over the liquid surface in the reaction vessel are comprised by the total pressure with which the measuring cell is emptied or filled; in the fourth place, the dimensions of the measuring cell, capillary and pressure must be selected so that the flow in the capillary during emptying or filling the measuring cell remains laminary; in the fifth place, the measuring result must be made visible in one way or another, such as by means of a time recorder and/or registration on a recorder.

What is claimed is:

1. An apparatus for measuring the viscosity of a liquid product in a vessel by measuring the flow time of a predetermined amount of said liquid product through a capillary, comprising:

a. a measuring cell including a measuring chamber of constant volume, a capillary outflow tube in communication with the measuring chamber at the lower end thereof, and a space above the measuring chamber, b. a supply of an inert gas under a predetermined pressure, c. a conduit system between the gas supply and the measuring cell for circulating gas through the measuring cell, the conduit system including a first conduit opening into the space above the measuring chamber, a second conduit opening into the measuring chamber at the upper end thereof, and a third conduit opening adjacent to the capillary tube, d. means in said conduit system for reversing the flow of the gas therein between a liquid filling cycle, wherein the gas circulates through the first conduit, said space and out the second conduit, until the liquid fills the measuring chamber and blocks the second conduit, and a liquid emptying cycle, wherein the gas from the second conduit presses the liquid out of the measuring chamber through the capillary tube, e. electrical control means for actuating said flow reversing means, and f. a time recording means, the control means switching on the time recording means and actuating the flow reversing means when the liquid blocks the second conduit, and switching off the time recording means in response to the gas pressure drop in the measuring cell at the moment the liquid has been fully pressed out of the measuring chamber through the capillary tube.

2. The apparatus of claim 1, further comprising a time-delay relay in the electrical control means for subsequently supplying the inert gas at a lower than said predetermined pressure to said conduit system for filling the measuring chamber with the liquid.

3. The apparatus of claim 1, wherein the electrical control means comprises a switching means for switching on the time recording means, which includes a vessel containing an electrically conductive liquid and a pair of electrodes positioned therein at different levels, the vessel being in communication with the conduit system and the level of the conductive liquid in said vessel being depressed under the increased pressure in the conduit system when the second conduit is blocked, and the depression of the level of the conductive liquid causing interruption of the electrical contact between the electrodes.

4. The apparatus of claim 1, wherein the electrical control means comprises a switching means for switching off the time recording means, which includes a vessel containing an electrically conductive liquid and a pair of electrodes positioned therein at different levels, the vessel being in communication with the second conduit and the level of the conductive liquid in said vessel being normally depressed to interrupt electrical contact between the electrodes under the pressure of the gas supplied to the third conduit, and the level of the conductive liquid rising to establish electrical contact between the electrodes by a pressure drop occurring at the moment all the liquid has been pressed out of the measuring chamber.

5. The apparatus of claim 1, further comprising an immersion tube surrounding the measuring cell and at least partially immersed in the liquid in the reaction vessel, the immersion tube extending beyond the capillary tube and having ports for circulating the liquid in the reaction vessel through the immersion tube.

6. The apparatus of claim 1, wherein the electrical control means comprises a switching means for switching on the time recording means which consists of a pressure differential sensitive switch actuated by the pressure rise occurring in the conduit system when the second conduit is blocked.

7. The apparatus of claim 1, comprising a pressure balanced reducing valve for pressing out the liquid from the measuring chamber under a constant overpressure, and wherein the electrical control means comprises a switching means for switching off the time recording means which consists of a pressure differential sensitive switch actuated by the pressure drop occurring in the conduit system when the liquid has been fully pressed out of the measuring chamber.

8. The apparatus of claim 1, wherein the third conduit opens at the same level as the capillary tube.

9. The apparatus of claim 1, wherein the third conduit opens at a level substantially below that of the capillary tube and wherein the electrical control means comprises a switching means for switching off the time recording means which consists of a pressure differential sensitive switch actuated by the pressure drop occurring in the conduit system when the liquid has been fully pressed out of the measuring chamber.

10. An apparatus for measuring the viscosity of a liquid product in a vessel by measuring the flow time of a predetermined amount of said liquid product through a capillary, comprising:
  a. a measuring cell including a capillary outflow tube at the lower end thereof,
  b. a supply of an inert gas under a predetermined pressure,
  c. a first conduit between the gas supply and the measuring cell which conduit has an outlet opening in the upper end of the measuring cell,
  d. a three-way valve in the first conduit
  e. a second conduit connected to said three-way valve which second conduit opens below the liquid level in the vessel beside the measuring cell at a level substantially above that of the capillary tube,
  f. two conductivity measuring devices at different levels in the measuring cell but both below the opening of the second conduit, and
  g. a time recording means, the conductivity measuring devices, respectively, switching on and off the time recording means when the liquid which rises in the measuring cell successively reaches the conductivity measuring device at the lower level and at the higher level.

11. An apparatus for measuring the viscosity of a liquid product in a vessel by measuring the flow time of a predetermined amount of said liquid product through a capillary, comprising:
  a. a measuring cell including a capillary outflow tube at the lower end thereof,
  b. a supply of an inert gas under a predetermined pressure,
  c. a first conduit between the gas supply and the measuring cell which conduit has an outlet opening in the upper end of the measuring cell,
  d. a three-way valve in the first conduit,
  e. a second conduit connected to said three-way valve which second conduit opens below the liquid level in the vessel beside the measuring cell at a level substantially above that of the capillary tube,
  f. two electrical capacity measuring devices at different levels in the measuring cell but both below the opening of the second conduit and
  g. a time recording means, the electrical capacity measuring devices, respectively, switching on and off the time recording means when the liquid which rises in the measuring cell successively reaches the electrical capacity measuring device at the lower level and at the higher level.

12. An apparatus for measuring the viscosity of a liquid product in a vessel by measuring the flow time of a predetermined amount of said liquid product through a capillary, comprising:
  a. a measuring cell including a capillary outflow tube at the lower end thereof,
  b. a supply conduit of an inert gas under a predetermined pressure having an outlet in the liquid in the vessel at a level substantially below that of the capillary tube,
  c. a first conduit connecting, via a three-way valve, a branch of the gas supply with the upper end of the measuring cell,
  d. two conductivity measuring devices at different levels in the measuring cell and e. a time recording means, the conductivity measuring device at the higher level switching on the time recording means when the liquid rising in the measuring cell reaches said device and the conductivity measuring device at the lower level switching off the time recording means when the liquid being pressed out of the measuring cell reaches said conductivity measuring device.

13. An apparatus for measuring the viscosity of a liquid product in a vessel by measuring the flow time of a predetermined amount of said liquid product through a capillary, comprising:
   a. a measuring cell including a capillary outflow tube at the lower end thereof,
   b. a supply conduit of an inert gas under a predetermined pressure having an outlet in the liquid in the vessel at a level substantially below that of the capillary tube,
   c. a first conduit connecting, via a three-way valve, a branch of the gas supply with the upper end of the measuring cell,
   d. two electrical capacity measuring devices at different levels in the measuring cell and
   e. a time recording means, the electrical capacity measuring device at the higher level switching on the time recording means when the liquid rising in the measuring cell reaches said device and the electrical capacity measuring device at the lower level switching off the time recording means when the liquid being pressed out of the measuring cell reaches said electrical capacity measuring device.

* * * * *